(12) United States Patent
Gerhart et al.

(10) Patent No.: US 10,725,931 B2
(45) Date of Patent: Jul. 28, 2020

(54) LOGICAL AND PHYSICAL ADDRESS FIELD SIZE REDUCTION BY ALIGNMENT-CONSTRAINED WRITING TECHNIQUE

(71) Applicant: Western Digital Technologies, Inc., San Jose, CA (US)

(72) Inventors: Darin Edward Gerhart, Oronoco, MN (US); Cory Lappi, Rochester, MN (US); Nicholas Edward Ortmeier, Rochester, MN (US); William Jared Walker, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 38 days.

(21) Appl. No.: 16/109,504

(22) Filed: Aug. 22, 2018

(65) Prior Publication Data
US 2020/0065258 A1  Feb. 27, 2020

(51) Int. Cl.
*G06F 12/10* (2016.01)
*G06F 12/1009* (2016.01)
*G06F 3/06* (2006.01)

(52) U.S. Cl.
CPC ............ *G06F 12/1009* (2013.01); *G06F 3/06* (2013.01); *G06F 2212/2022* (2013.01)

(58) Field of Classification Search
CPC .............................. G06F 12/1009; G06F 3/06
See application file for complete search history.

(56) References Cited

U.S. PATENT DOCUMENTS

| 7,013,379 | B1 * | 3/2006 | Testardi | G06F 3/0613 |
| | | | | 711/206 |
| 7,334,069 | B2 * | 2/2008 | Araki | G06F 9/5016 |
| | | | | 710/36 |
| 7,533,238 | B2 * | 5/2009 | Burns | G06F 12/0223 |
| | | | | 710/33 |
| 8,751,763 | B1 * | 6/2014 | Ramarao | G06F 16/1752 |
| | | | | 711/162 |
| 9,058,284 | B1 * | 6/2015 | Ben-Meir | G06F 12/10 |
| 9,824,026 | B2 * | 11/2017 | Dong | G06F 9/455 |
| 9,892,056 | B2 * | 2/2018 | Bryant | G06F 12/084 |
| 9,959,209 | B1 * | 5/2018 | Burton | G06F 11/3058 |

(Continued)

OTHER PUBLICATIONS

Zhiyong Xu, Ruixuan Li, Cheng-Zhong Xu, CAST: A page-level FTL with compact address mapping and parallel data blocks. 2012 IEEE 31st International Performance Computing and Communications Conference (IPCCC). (Year: 2012).*

(Continued)

*Primary Examiner* — Khoa D Doan
(74) *Attorney, Agent, or Firm* — Patterson & Sheridan, LLP; Steven Versteeg

(57) ABSTRACT

A method and arrangement are disclosed involving receiving a read-type command at a data storage arrangement, calculating a command span of the received read-type command and performing a look-up command, through use of a processor, for data located in each extent at a condensed logical block address state table for the read-type command, wherein the condensed logical block address state table describes a logical to physical table and at least one of transmitting data and displaying data related to the read-type command found in the condensed logical block address state table.

25 Claims, 5 Drawing Sheets

(56) References Cited

U.S. PATENT DOCUMENTS

| | | | |
|---|---|---|---|
| 10,102,138 B2* | 10/2018 | Lin | G06F 9/441 |
| 10,146,616 B1* | 12/2018 | Shilane | G06F 11/141 |
| 2002/0065924 A1* | 5/2002 | Barrall | H04L 29/06 |
| | | | 709/227 |
| 2003/0140209 A1* | 7/2003 | Testardi | G06F 3/0601 |
| | | | 711/203 |
| 2004/0103245 A1* | 5/2004 | Fukusawa | G11B 20/10527 |
| | | | 711/113 |
| 2005/0144371 A1* | 6/2005 | Walker | G06F 12/0879 |
| | | | 711/105 |
| 2005/0160188 A1* | 7/2005 | Bogin | G06F 13/161 |
| | | | 710/1 |
| 2005/0182896 A1* | 8/2005 | Song | G06F 12/0866 |
| | | | 711/112 |
| 2006/0031602 A1* | 2/2006 | Ellis | G06F 13/28 |
| | | | 710/22 |
| 2009/0132757 A1* | 5/2009 | Lin | G06F 12/0804 |
| | | | 711/103 |
| 2009/0168525 A1* | 7/2009 | Olbrich | G06F 13/1657 |
| | | | 365/185.11 |
| 2011/0022779 A1* | 1/2011 | Lund | G06F 12/0246 |
| | | | 711/103 |
| 2011/0289273 A1* | 11/2011 | Ikeuchi | G06F 3/0613 |
| | | | 711/114 |
| 2012/0221776 A1* | 8/2012 | Yoshihashi | G06F 12/0804 |
| | | | 711/103 |
| 2013/0166855 A1* | 6/2013 | Batwara | G06F 3/0608 |
| | | | 711/154 |
| 2014/0013026 A1* | 1/2014 | Jannyavula Venkata | |
| | | | G06F 12/0246 |
| | | | 711/103 |
| 2014/0258675 A1* | 9/2014 | Takeuchi | G06F 3/0614 |
| | | | 711/206 |
| 2015/0058526 A1* | 2/2015 | Venkata | G06F 3/061 |
| | | | 711/103 |
| 2015/0066875 A1* | 3/2015 | Peake | H04L 67/1097 |
| | | | 707/692 |
| 2016/0054931 A1* | 2/2016 | Romanovsky | G06F 3/0608 |
| | | | 711/103 |
| 2016/0117252 A1* | 4/2016 | Thangaraj | G06F 12/0871 |
| | | | 711/118 |
| 2016/0139822 A1* | 5/2016 | Kondo | G06F 12/0862 |
| | | | 711/103 |
| 2016/0342367 A1* | 11/2016 | Alcantara | G06F 3/061 |
| 2017/0115914 A1* | 4/2017 | Byun | G06F 3/0625 |
| 2017/0322728 A1* | 11/2017 | Huang | G06F 3/061 |
| 2017/0329716 A1* | 11/2017 | Huang | G06F 12/0246 |
| 2018/0173462 A1* | 6/2018 | Choi | G06F 3/0659 |
| 2019/0079681 A1* | 3/2019 | Trika | G06F 3/0673 |
| 2019/0146913 A1* | 5/2019 | Trika | G06F 12/0246 |
| | | | 711/103 |
| 2019/0146930 A1* | 5/2019 | Verhaeghe | G06F 12/1475 |
| | | | 711/152 |
| 2019/0205244 A1* | 7/2019 | Smith | G06F 3/0613 |
| 2019/0303304 A1* | 10/2019 | Lee | G06F 12/1466 |
| 2019/0332325 A1* | 10/2019 | Dong | G06F 12/0866 |
| 2019/0341116 A1* | 11/2019 | Choi | G06F 9/30029 |

OTHER PUBLICATIONS

Y. J. Seong et al., "Hydra: A Block-Mapped Parallel Flash Memory Solid-State Disk Architecture," in IEEE Transactions on Computers, vol. 59, No. 7, pp. 905-921, Jul. 2010. (Year: 2010).*

* cited by examiner

LOGICAL AND PHYSICAL ADDRESS FIELD SIZE REDUCTION BY ALIGNMENT-CONSTRAINED WRITING TECHNIQUE

BACKGROUND OF THE DISCLOSURE

Field of the Disclosure

Embodiments of the disclosure relate to logical block address operations for data storage arrangements. More specifically, aspects relate to providing a condensed logical block address (LBA) state table (CLST) and usage of such tables.

Description of the Related Art

Data storage arrangements, such as solid state drives (SSDs), are increasingly being used due to advantages of power consumption, reliability and stability. In conventional SSDs, tables are used to look up various pieces of data that are needed for computation. When operating properly, the use of tables ensures consistent performance.

As time progresses, the need for SSDs with increased capacity grows more prevalent. The sizes of these SSDs presently grow into the terabyte range. Where such massive amounts of data are stored, tables are used to help categorize locations of the data so that reference may be made quickly to the data needed. These tables, called indirection tables, allow for the identification of needed data through use of a name provided to the data, rather than storing the locations of the actual values themselves.

To ensure consistent performance of a SSD, a sufficient amount of memory must be provided for the workload being encountered. As a non-limiting embodiment, workloads may be provided with a 4 KiB (kibibyte) granularity, which is commonly referred to as 4 k workload. For a 1 terabyte capacity drive, a significant amount of dynamic random-access memory ("DRAM") is needed. Provision of DRAM in a host or a SSD can be more expensive than other types of memory, therefore minimizing the amount of DRAM is desired from a manufacturing cost perspective. In the above example of a one (1) terabyte capacity drive, approximately one (1) gigabyte of DRAM is necessary for the indirection tables needed.

Indirection tables may come in different formats. One such indirection table format is a tree based indirection format. When reference is made to a table based on a tree type format, continual reference is made to different sections of the table until the desired data is found. Another type of indirection table is an on-demand indirection scheme or flat indirection scheme, where the desired data is found by address-based direct indexing into the indirection table. In either the tree or on-demand type of table, depending on the complexity of the table or the request, performance variability may occur. An increase in capacity of an SSD will require a larger indirection table. Such ever increasing larger tables inhibit the fast processing of the data as the sheer volume of data to be reviewed grows larger over time.

Small computer system interface (SCSI) commands access data in contiguous chunks during command processing. SCSI commands, therefore, may be delayed during processing if the contiguous chunks of needed data are not found in a timely manner.

Processing of certain commands, such as format, key erase, revert, sanitize, and unmap may also depend on extensive indirection table processing. As such commands may take large amounts of time to process, computer manufacturers may place stringent requirements on manufacturers of the SSD to make sure that latency is minimized for computer users when these commands are issued.

In other operations, computer users may issue a "Get LBA Status" command in order to query logical block address mapping status. Such commands may be used, for example, in drive rebuild operations. When such an open-ended command is issued, an indeterminate amount of logical block address processing is performed at the time the command is received. If such a command is issued concurrently with other types of commands, for example a media command from a user that is resource intensive, latency may be experienced by the user.

Operational difficulties may also be experienced when certain interactions are encountered. One such interaction may be encountered when a host, such as a computer, does not support or provide for logical block address collision management. If such logical block address collision management is not provided, queued media commands may collide with a "Get LBA Status" command resulting in indeterminate results.

Conventional indirection table usage has other difficulties. One example difficulty is the use of logical block address mapping statistics that may require additional per command firmware overhead to maintain. In other examples, some host applications perform certain operations, such as a media scrub or background media scan over uninitialized logical block addresses. Such operations are an inefficient use of device resources and power when the device contains large contiguous ranges of unmapped blocks. Conventional indirection tables do not provide any formats that provide for abbreviated or condensed data that may be used to aid in processing.

There is a need for a condensed logical block address state table (CLST) to aid in processing.

There is a further need for providing guidance for the use of the CLST and the individual entries, defined as extents, so that processing may be aided.

There is a need for a method and apparatus that will provide more concentrated or condensed data to provide processing with minimal latency.

There is also a need for a cost-effective method and apparatus to provide for improved processing of data.

There is a further need for a method and apparatus to handle large data storage arrangements, such as a large capacity SSD, without the need to provide excessive amounts of DRAM.

There is a still further need for a method and apparatus that is compatible with existing hosts to prevent indeterminate results when commands are issued at a time that is contemporaneous to processing of commands.

SUMMARY OF THE DISCLOSURE

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Aspects of the disclosure relate to a condensed logical block address state table that can be used to process data stored in a data storage arrangement.

In one non-limiting embodiment, a method is disclosed comprising: receiving a read-type command at a data storage arrangement, calculating a command span of the received read-type command; performing a look-up command, through use of a processor, for data located in each extent at a condensed logical block address state table for the read-type command, wherein the condensed logical block address state table describes a logical to physical table and at least one of transmitting data and displaying data related to the read-type command found in the condensed logical block address state table.

In another non-limiting embodiment, a method for performing a write-type command, is disclosed comprising: receiving the write-type command at a data storage arrangement, calculating a command span length for the write-type command received; performing a look-up command, through use of a processor, for data located in a first extent of a condensed logical block address state table for the write-type command, wherein the condensed logical block address state table describes a logical to physical table; and at least one of transmitting data and displaying data related to the write-type command found in the condensed logical block address state table.

In another non-limiting embodiment, a method for performing a unmap-type command is disclosed comprising receiving the unmap-type command at a data storage arrangement, determining a logical block address range for processing, performing a look-up command, through use of a processor, for data located in a first extent of a condensed logical block address state table for the unmap-type command, wherein the condensed logical block address state table describes a logical to physical table and at least one of transmitting data and displaying data related to the unmap-type command found in the condensed logical block address state table.

In another non-limiting embodiment, an apparatus for performing a read-type command is disclosed comprising means for receiving the read-type command, means for calculating a command span length for the read-type command received, means for performing a look-up command, through use of a processor, for data located in a first extent of a condensed logical block address state table for the read-type command and means for at least one of transmitting data and displaying data related to the read-type command found in the condensed logical block address state table.

An apparatus for performing a write-type command, comprising: means for receiving the write-type command, means for calculating a command span length for the write-type command received, means for performing a look-up command, through use of a processor, for data located in a first extent of a condensed logical block address state table for the write-type command and means for at least one of transmitting data and displaying data related to the write-type command found in the condensed logical block address state table.

In another non-limiting embodiment, an apparatus for performing an unmap-type command is disclosed comprising means for receiving the unmap-type command, means for determining a logical block address range for processing, means for performing a look-up command, through use of a processor, for data located in a first extent of a condensed logical block address state table for the unmap-type command and means for at least one of transmitting data and displaying data related to the unmap-type command found in the condensed logical block address state table.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
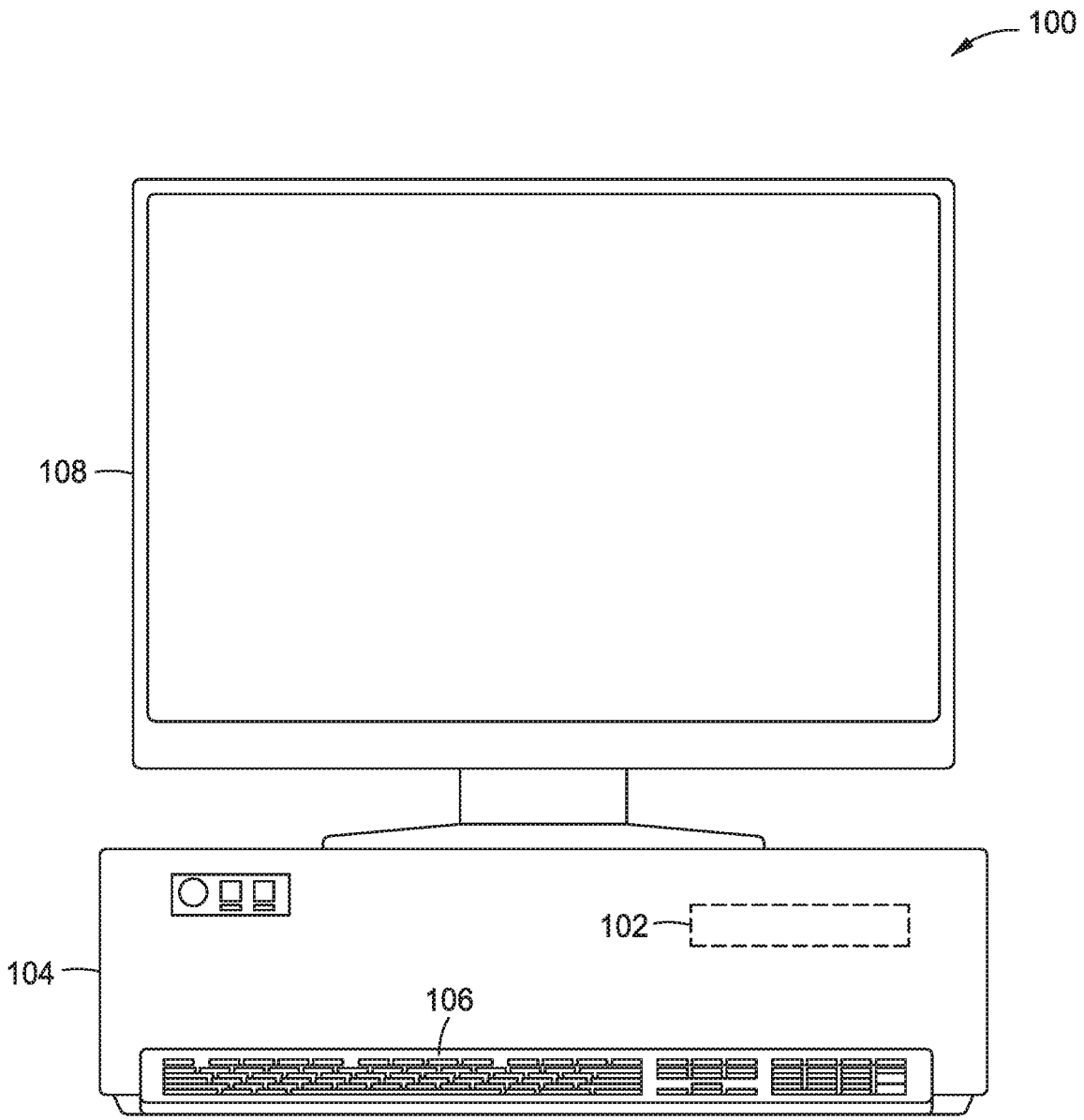
FIG. 1 is a diagram of a host and data storage arrangement in one non-limiting embodiment of the disclosure.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage and specifically, performing high efficiency information storage and retrieval operations. The storage device may or may not be connected to a computer host. In the embodiments described, a data storage arrangement is connected to the host system. The function of the data storage arrangement is to accept data and store the data until needed again by a user or the host. The data storage arrangement may be configured to accept bursts of data, depending on the computer process performed, therefore the data storage arrangement is configured with multiple memory units that provide for various states of usage. Certain sections of the data storage arrangement are configured with memory systems that enable fast action (low latency) so that computer processes may be conducted at a rapid pace. Such low latency performance may be accomplished by single layer cell (SLC) memory configurations. If bulk amounts of data are required to be stored, multiple layer cell memory configurations may also be present, such as triple level cell (TLC) memory configurations. The data storage arrangement may have an interface that allows the data storage arrangement to connect with the host. The interface may be a Serial Attached SCSI (SAS) Interface or Serial ATA (SATA) compatible interface, as a non-limiting embodiment. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection. While being described as SATA compatible, other types of interfaces may be used.

Auxiliary connections may be provided to the data storage arrangement to allow for additional options for inputting data directly to the data storage arrangement without interfacing with the host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

In one non-limiting embodiment, a controller is provided to control actions of the data storage arrangement as required by the host. The controller may also be configured to perform maintenance activities for the data storage arrangement to allow for efficient use.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, or stereo audio systems. The internal software may also be provided such that the access of data may be performed by cloud applications designed for interfacing with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

The internal software may also be capable of providing diagnostic support for users. In such configurations, two different modes may be provided. A quick test software program may be provided with the capability to check the data storage arrangement for major performance problems. A full test mode may also be provided to provide detailed status information to a user. Such status information may be, for example, total amount of memory of the data storage arrangement, the amount of memory storage used, storage divisions provided on the data storage arrangement, firmware versions for the internal software, memory block errors and similar data. The internal software may also have the capability of accepting data to update the firmware of the internal software.

The internal software may also be used as a server system wherein in certain embodiments, Digital Living Network Alliance (DLNA) enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secure log in or an anonymous login capability.

In specific embodiments, the data storage arrangement may be configured such that the system interacts with cloud storage systems. In the event that the data storage arrangement approaches the limits of storage capability, the data storage arrangement may allow for some of the data to be stored on cloud based systems. Selection of the data to be stored on such external storage systems may be governed by the controller which is configured to determine what sections of data may be appropriately stored in cloud based systems to minimize latency for users. The storage system may have a unique identifier MAC address and device name to allow the system to operate on an independent basis. The storage system may also be operated in a configuration that allows for the system to clone a MAC address of a computer that is attached.

The overall capacity of the data storage arrangement may vary according to the different embodiments provided. Capacities of 1 TB, 2 TB, and up to 64 TB may be provided, as non-limiting embodiments. Different form factors may also be provided. In the illustrated embodiment, a form factor of 2.5 inches is provided. Other form factors such as 1.8 inch or 3.5 inch may also be used. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OS 10.7), Mountain Lion (Mac OS 10.8), Mavericks (Mac OS 10.9), Yosemite (Mac OS 10.10), El Capitan (Mac OS 10.11), Sierra (Mac OS 10.12) and High Sierra (Mac OS 10.13) as non-limiting embodiments. Supported browsers for the storage system may be, in non-limiting embodiments, Internet Explorer, Safari, Firefox and Google Chrome.

Software may also be included in the system to allow for quick and automatic backups of data according to user prescribed requirements. Such backup ability may be compliant with Windows based backup and restore functions and/or Apple Time Machine requirements. Furthermore, software may be provided to add more than one user to the storage system. Users can be added or deleted according to an administration account. Such administration account may also allow for restricted access for certain users according to administration requirements.

Aspects of the disclosure relate to a condensed LBA State Table (CLST) that tracks LBA state information ahead of the logical to physical table. LBA state defines the current logical to physical mapping allocation for a given LBA and consists of LBA states such as mapped or mapped. A mapped LBA state indicates that the LBA is mapped to a physical location and contains valid data, while an unmapped LBA state indicates that a LBA is not mapped to a physical location and there is no valid customer data stored at that LBA. The CLST tracks the state of groups of LBA to summarize the logical to physical table, thus reference may be made to the CLST to provide a summary of the logical to physical table. Individual entries in the CLST that summarize a mapped state for a LBA group may be defined as an extent (e.g. 1M Blocks grouped per extent). In one embodiment, the CLST has a smaller footprint allowing for faster access to LBA state information for large contiguous ranges of LBAs. The CLST always provides 100% accurate lookup for extents that are fully unmapped at command receive time. In some instances, the percent of mapped blocks may be inaccurate depending upon outstanding queued commands or background updates. To resolve such inaccuracies, a locking mechanism may be used to coordinate simultaneous CLST requests between firmware and hardware. The CLST is included as part of a power-safe memory (e.g. PLI, SCRAM) that is restored on each power-on.

In embodiments provided, the CLST is provided with a management system to ensure high performance operations. Firmware is provided to initialize the table during format, sanitize or revert commands. Hardware may also be provided to update the CLST as new write-type commands arrive to transition extents from unmapped to mapped states. In some embodiments, the hardware maintains an extent percent mapped register field that tracks the percentage of extents that are mapped. The extent percent mapped is updated as each extent is accessed and updated. The firmware may update the CLST to move extents from mapped to unmapped during unmap, write same unmap, TCG key erase or range management command handling.

The firmware background CLST scrub operation may refine the extent state information such as actual extent percentage mapped.

A number of configuration options are provided to the CLST. The extent size may be configured wherein a number of bits representing each extent may be provided. In one non-limiting embodiment, a 1 b entry size may support two states where the value 0=extent is fully unmapped and the value 1=extent has 1 or more mapped blocks. In other embodiments, a 2b entry size supports 4 states where 0=extent is fully unmapped, the value 1=extent contains mapped blocks below the extent mapped percentage threshold, the value 2=extent contains mapped blocks above extent mapped percentage threshold, the value 3=extent is fully mapped. In other embodiments, 4 b, 8 b or larger sizes could be supported if needed for additional granularity in extent mapping percentages.

The extent range may also be configured, wherein a number of blocks represented may be specified, wherein the number of blocks directly affects the CLST table size. An extent count may also be provided as a configuration option. An extent mapped percentage threshold may also be provided as a configuration option. The extent mapped percentage threshold may define a mapped percentage for the first buckets of LBAs that are mapped in the extent. Such configuration is not valid for a 1b extent size. For a 2 b extent size mode, 80% means the extent value is set to 2 when 80% or more of the LBAs in the extent are mapped, otherwise the extent value is set to 1. For 4b or larger modes, 10% means a first bucket is 10% mapped with remaining buckets equally dispersed between remaining values to provide even further granularity in tracking extent percentage mapped.

Referring to FIG. 1, a host computer 100 is illustrated. The host computer 100 is configured with a data storage arrangement 102, such as a solid state drive. The solid state drive 102 is configured to store data that is needed by a user. The use may be immediate or may be years distant, therefore the solid state drive 102 is configured to store the data in a non-volatile manner. Non-volatile storage allows data to be stored within the drive 102 without the drive 102 being connected to a power source. In the illustrated embodiment, the solid state drive 102 may be configured to be removable from the host computer 104. In another embodiment, the solid state drive 102 may be permanently housed within a host computer housing 104. In the solid state drive 102 different types of memory may be used, for example, NAND flash or NOR flash. The host computer 100 may also be configured with an input device 106, such as a keyboard, to allow the user to input data. A monitor 108 may be provided for output of analysis performed by circuitry, such as a second circuit, described later.

Figure 2:
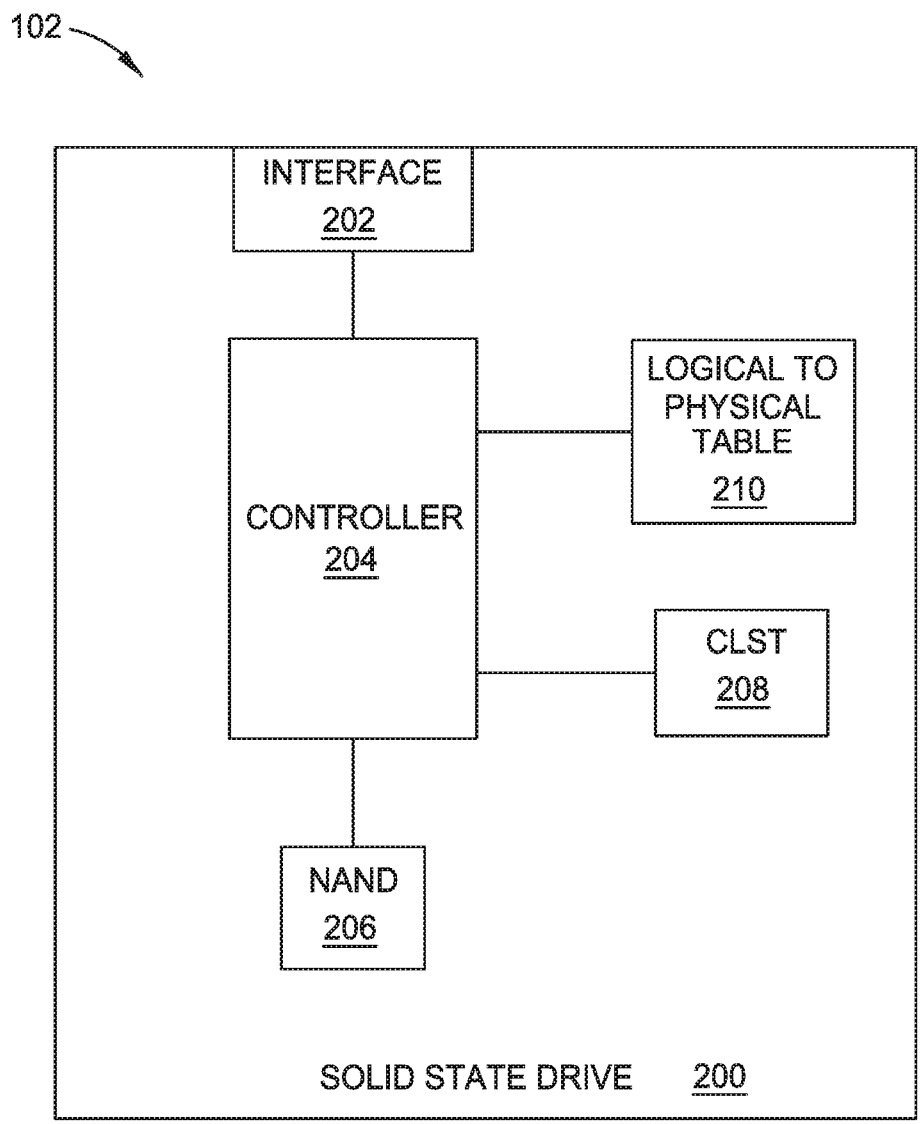
FIG. 2 is a block diagram of a solid state drive.

Referring to FIG. 2, an example solid state drive 200 is illustrated. The solid state drive 200 may be used as the storage device 102. The solid state drive 200 is provided with an interface 202 that allows for interface with the host computer 104 in FIG. 1. A controller 204 is provided to control actions of the solid state drive 200. Storage of data is performed by the NAND 206. The NAND 206 may be a single unit of banks of multiple units as non-limiting embodiments. A logical to physical table (indirection table) 210 may be used for reference by the controller 204 to determine a location of data within the NAND 206. The CLST 208 may be a separate table from the logical to physical table (indirection table) 210. The CLST 208 may be used by the controller 204 for reference for activities that involve the NAND 206 to improve latency during processing. Thus, when reference is to be made to the NAND 206 for data, the CLST 208 may be referenced providing a quick reference, rather than referring to the logical to physical table 210. In embodiments, the use of the CLST 208 may occur for each action that must be performed at the NAND 206. In other embodiments, the use of the CLST 208 may be reserved for certain types of processing.

Figure 3:
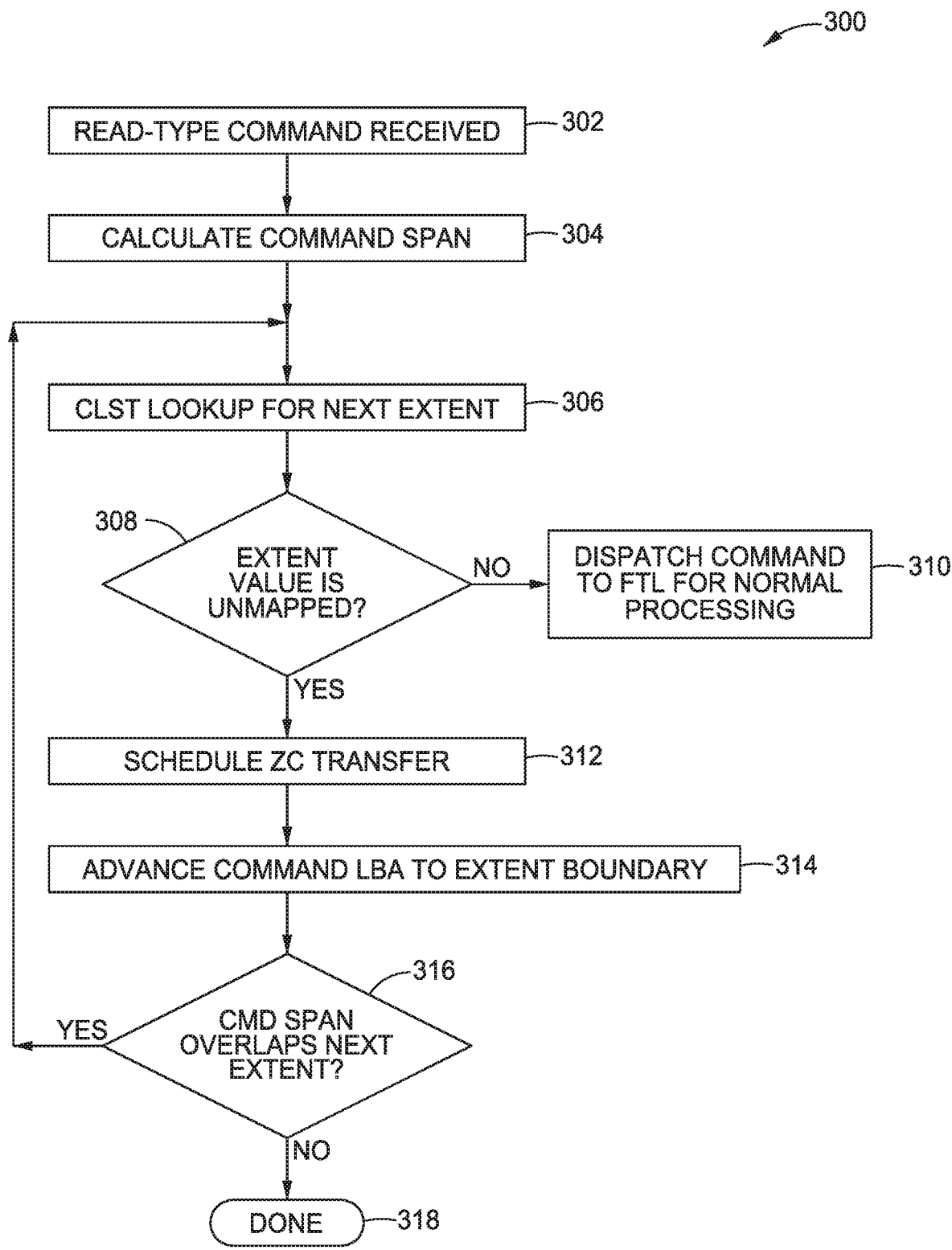
FIG. 3 is a flow chart for a method for a read-type command CLST lookup operation.

Referring to FIG. 3, a read command CLST lookup method 300 is provided for a firmware and/or hardware implementation. The method 300 begins at 302 where a read-type command is received 302. The command may be received at a controller for a SSD, as a non-limiting embodiment. The method progresses to 304 wherein a command span is calculated. The method progresses to 306 wherein the CLST lookup is conducted for the next extent. The method progresses to 308 wherein a query is run to determine if the extent value is unmapped. If the extent value is not unmapped, a dispatch command is provided to the flash translation layer (FTL) for normal processing at 310. If the extent value is unmapped, then at 312, an unmapped data pattern (e.g. typically ZC or zero content) is scheduled for transfer. The method progresses to 314, wherein the current command LBA is advanced to the extent boundary. The method then progresses to 316 where a query is again performed to determine if the command span overlaps the next extent. If the command span does not overlap the next extent, then the method ends at 318. If the command span does overlap the next extent, then the method returns to 306.

For FIG. 3, the method provided is applicable to read-type commands, such as read and verify commands. Command spans, as provided in 304, are calculated according to the formula:

$$\text{Command Span}=\text{Start LBA}+\text{Length}-1 \quad (\text{EQ.1})$$

The CLST lookup may be completed for extents that are overlapped by the command span. The hardware utilizes a command start LBA based index to directly access affected CLST extents which avoids the need to perform a time-costly search.

The receive path checks whether the extent values indicate that the extent is unmapped. If the extent is mapped or partially mapped, the receive path dispatches the command to the flash translation layer for normal processing, as in step 310. If the extent is unmapped, the receive path bypasses the flash translation layer for this portion of the command and schedules a zero content transfer.

Figure 4:
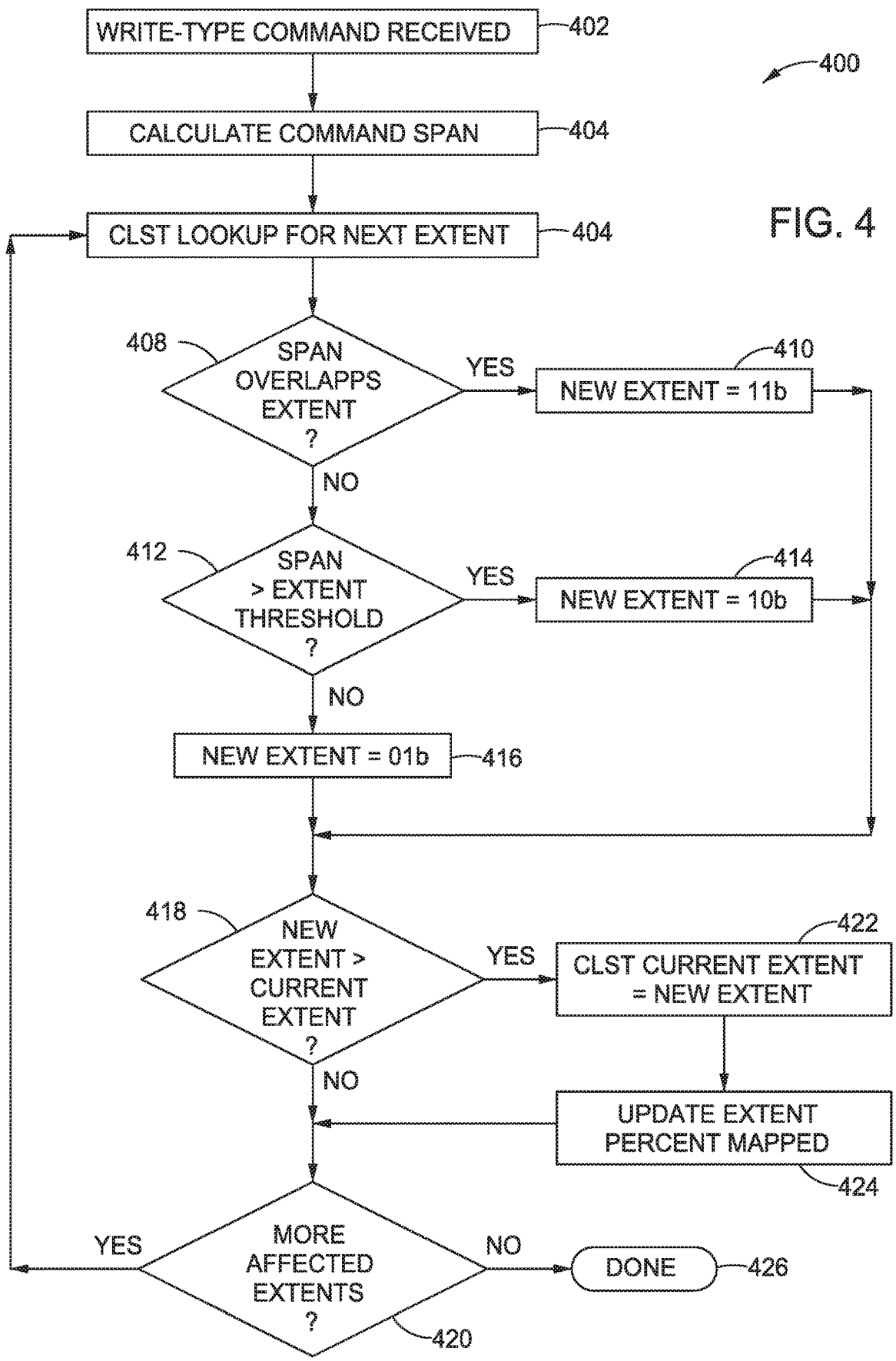
FIG. 4 is a flow chart for a method for a write-type command CLST operation.

Referring to FIG. 4, a firmware and/or hardware implementation for a method 400 for write command handling is illustrated. The method starts at 402, where a write type command is received. The write type command may be a write, write stream, write scatter, write atomic and/or a write & verify command, as non-limiting examples. The command may be received at a controller for a SSD, as a non-limiting embodiment. The method progresses to 404 where a command span value is calculated. For the write command, the value of the command span may be calculated as follows:

$$\text{Command Span}=\text{Start LBA}+\text{Length}-1 \quad (\text{EQ.2})$$

The method progresses to 406 where a CLST lookup occurs for the next extent. The method progresses to 408, wherein a query is run to determine if the command span overlaps the extent. If the command span overlaps the extent at 408, then a new extent value is set equal to 11b (3 decimal) to reflect that the extent is fully mapped at 410 with the method progressing to 418. The hardware utilizes a command start LBA based index to directly access affected CLST extents which avoids the need to perform time costly searches. If the command span does not overlap the extent at 408, then a query is run at 412 to test if the command span is greater than an extent threshold. If the command span is greater than the extent threshold, then a new extent value is set equal to 10b (2 decimal) at 414 to reflect that the extent contains mapped blocks that exceed the extent threshold with the method progressing to 418. If the command span is not greater than the extent threshold at 412, then a new extent value is set equal to 01b (1 decimal) at 416 to reflect that the extent does not contain mapped blocks that exceed the extent threshold.

The method progresses to 418 where a query is performed. The query determines if the value of the new extent is greater than the current extent. If the value of the new extent is greater than the current extent then the CLST current extent value is made equal to the new extent value at 422. The method then progresses to 424 wherein an update to the extent percent mapped is performed and wherein the method progresses to 420. If, at the query at 418 the new extent is not greater than the current extent, then the method progresses to 420 where a query is performed to determine if there are more affected extents for this current command span. If there are more affected extents, then the method loops back to 406 to continue processing the next extents for this current command span. If there are no more affected extents, the method ends at 426.

Figure 5:
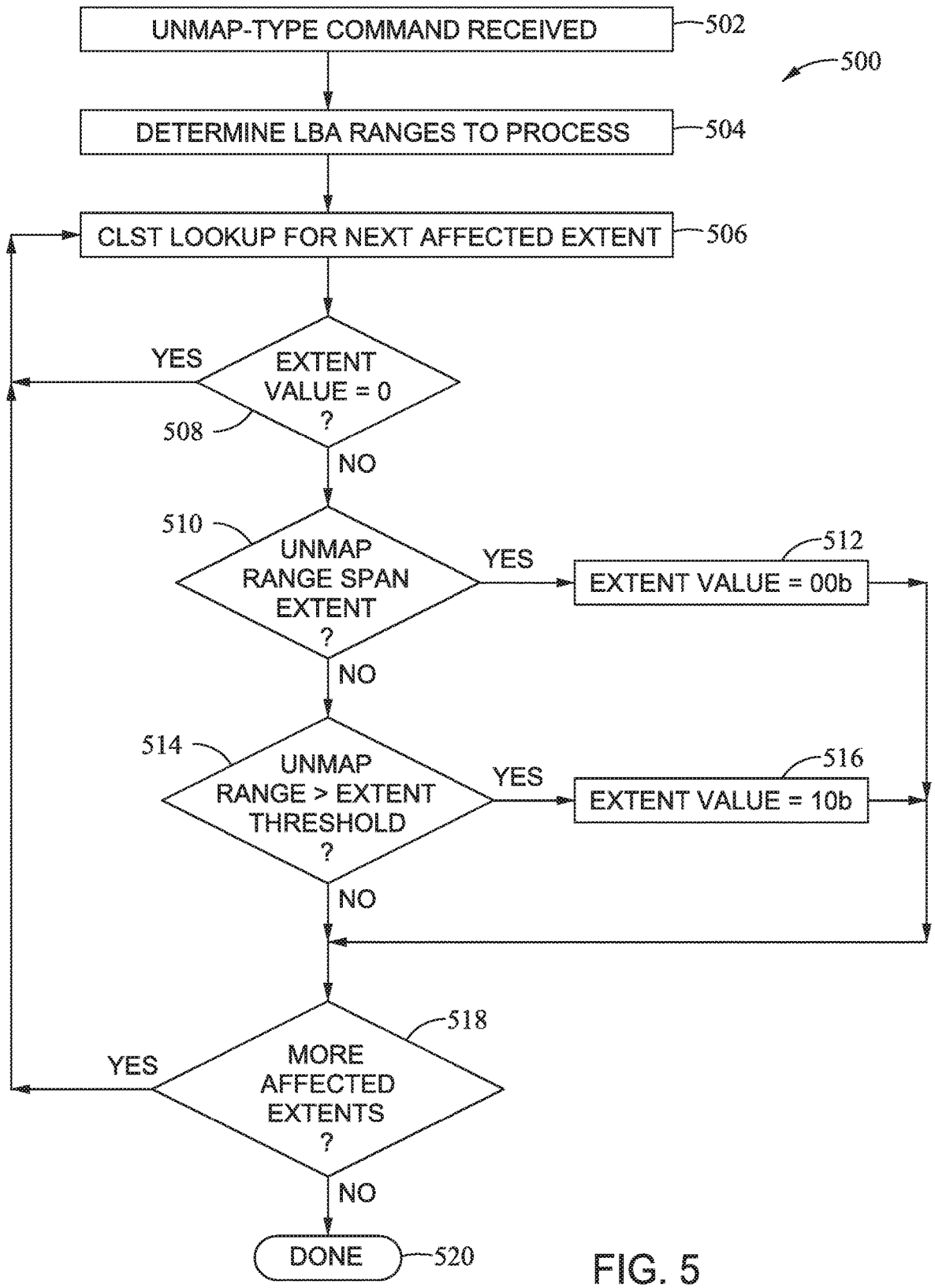
FIG. 5 is a flow chart for a method for CLST management command handling.

Referring to FIG. 5, a firmware and/or hardware CLST management—unmap command handling method 500 is illustrated. The method 500 starts at 502 where an unmap type of command is received. The unmap type command may be an unmap, write same (unmap=1), encryption key erase, format, sanitize, or revert command, as non-limiting examples. The method progresses to 504 wherein LBA ranges are determined for processing. Such determinations are made, for example, by the controller of a SSD. The controller, in this embodiment as well as the other embodiments disclosed, may be a single processor, multiple processors or an application specific integrated circuit ("ASIC").

The method progresses to 506 wherein the CLST lookup is performed for a next affected extent. The method progresses to 508 where a query is performed to determine if the extent value=0. If the extent value is equal to 0 reflecting that all the blocks within the extent are already fully unmapped, the method loops from 508 to 506. If the extent value is not equal to 0, then the method progresses to 510 where a query is performed.

At 510, a query is performed to determine if the unmap range spans the extent. If the unmapped range does span the extent, then the extent value is set equal to 00 b at 512 to reflect that all blocks within the extent are fully unmapped. The method then proceeds on to query 518. If, at 510, the unmap range does not span the extent, then the method proceeds to 514. At 514, a query is run to determine if the unmap range is greater than the extent threshold. If the unmap range is greater than the extent threshold, then the method proceeds to 516 where the extent value is set equal to 10b (2 decimal) to reflect that the extents contains mapped blocks that exceed the extent threshold. The method then proceeds to a query at 518. If the unmap range is not greater than the extent threshold at 514, then the method progresses to the query at 518.

At 518, a query is run to determine if there are more affected extents. If there are no more affected extents, then the method ends at 520. If there are more affected extents, then the method loops back to 506 for further processing, as described above.

In one non-limiting embodiment, individual extent updates may be performed. Such individual extent updates may be used during unmap, write same (unmap=1) or TCG key erase. Firmware processes unmap ranges and updates the CLST extent entry to match unmapped LBAs. In non-limiting embodiments, firmware may loop through unmapped LBAs. Firmware may also perform CLST extent lookups using an LBA index. If an extent loop is already 00b, the new unmap has no effect on this extent so the method may proceed with next iterations of the LBA loop. If the unmap region spans the extent range, then the extent value may be set to 00b to reflect a fully unmapped extent. If the unmapped region is larger than an extent threshold for this extent, then the extent value is set to 10 b, otherwise, during FW extent updates, the hardware updates the extent percent mapped value.

Background logical to physical and media trim scheduling may also be performed. In non-limiting examples, such scheduling may be used for command performance improvement for commands that perform large contiguous unmap functions. Large contiguous unmap functions must align with the extent boundary. Following CLST extent updates to unmapped values (e.g. 00b), the status is returned to the host early. An unmap request for updated extents is sent to the flash translation layer system for logical to physical updates utilizing normal LBA range locking data paths. The flash translation layer completes logical to physical updates to synchronize with the CLST in the background (e.g. after command is already completed). Media access commands that are issued prior to the background may be processed through normal data path processing. The reads perform the CLST update and return a zero content value. Writes are dispatched through normal LBA range locking data path (blocked behind previously dispatched background unmap for that overlapped range).

Background CLST scrub operations may also be performed. During idle time, background CLST scrub schedules the next extent candidate to scrub. Extent candidate may be selected by a variety of mechanisms (e.g. round robin, most recently accessed, most frequently accessed). If the current extent value is 00b, no scrub operation is required for this extent and the background CLST scrub selects the next extent candidate. The background CLST scrub determines the current mapped percentage for the extent by performing logical to physical lookup for all indirection units affected by the extent range. If the logical to physical lookup indicates that there is 0% mapped, then the extent value is set to 00b. If the logical to physical lookup indicates 100% mapped, then the extent value is set to 11b. If the logical to physical lookup indicates a percentage greater than the extent threshold, then the extent value is set to 10b. Otherwise, the extent value is left set to 01 b. During the FW extent updates, the hardware updates the extent percent mapped value.

The CLST Design supports extensive flexibility in resource requirements based on input configuration parameters. Devices with unconstrained resources may allocate more memory to the CLST to optimize performance benefits. Devices with memory resource constraints can use must smaller CLST tables with a trade-off in reduced performance benefits. As such is the case, CLST tables may come in varying sizes. As the CLST tables are smaller than logical to physical tables, however, performance is increased during processing.

In one non-limiting embodiment, the CLST configuration parameters may provide for an extent size of 2 bits per extent (4 extents per byte), extent range of 1MiBlock extent (0x10 0000), for a 16 TB drive and a 512 blocksize. Actual calculations provide for such an embodiment provide:
Device capacity=16 TiB=161 0241 0241 024*1024=0x1000 0000 0000 bytes
Device Blocks=16 TiB/512=0x8 0000 0000 blocks
Device Blocks/Extent Range=0x8 0000 0000/0x10 0000=Requires 0x8000 (32768) CLST Entries
CLST Memory Requirement=0x8000 Extents/(4 Extents/Byte)=0x2000 (8192)=8 KiB

TABLE 1

| Capacity | Blocksize | Extent Range | Extent Size | CLST Size |
|---|---|---|---|---|
| 16 TB | 512 | 1 MiBlock (0x100000 Blocks) | 2 b | 8 KiB |
| 16 TB | 512 | 16 KiBlock (0x4000 Blocks) | 2 b | 512 KiB |
| 16 TB | 512 | 16 KiBlock (0x4000 Blocks) | 1 b | 256 KiB |
| 16 TB | 4k | 1 MiBlock (0x100000 Blocks) | 2 b | 1 KiB |
| 16 TB | 4k | 1 KiBlock (0x400 Blocks) | 2 b | 1 MiB |
| 16 TB | 4k | 1 KiBlock (0x400 Blocks) | 1 b | 512 KiB |

Table 1 illustrates how different configuration parameter changes affect the CLST table size.

In the embodiments described, there is an efficient "Get LBA" status processing. The CLST is used for initial construction of the LBA mapping state descriptors. If the "Get LBA" status command range spans extents that are either fully mapped (e.g. extent value=11 b) or fully unmapped (e.g. extent value=00 b), the LBA mapping descriptors are efficiently generated by bypassing many discrete indirection lookups in the logical to physical table. If the "Get LBA" status command range spans extents that are partially mapped (e.g. 01 b or 10 b), then normal logical to physical lookup is utilized to generate LBA mapping descriptors.

Fast execution for commands is provided for commands that require large contiguous unmap operations. For commands such as format, sanitize, revert, TCG key erase, unmap and write same (unmap=1) commands, the use of the CLST methods provides for expedited operations. A command status is returned after the CLST table updates are complete. The background unmap commands are scheduled to synchronize logical to physical data with the CLST. The CLST is stored in a power-safe memory that is restored on each power-on.

As will be understood, a fast zero content read command processing is also provided. With a hardware CLST lookup, read commands that access extents that are fully unmapped are identified during command reception. These read commands are immediately scheduled for zero content host transfer. These commands bypass the flash translation layer dispatch and avoid consuming system resources and performing unnecessary discrete indirection unit logical to physical lookups.

In the embodiments provided, the extent percent mapped register may be used to directly provide log page information on the amount available mapping resources (e.g. avoid the need to process logical to physical mapping table to determine log page information). The CLST may also be configured such that the CLST extent mapped percentage threshold value may align with the SCSI mode page 0x1C subpage 2 resource provisioning threshold settings to allow for simply checking the extent percent mapped register for logical provision notifications implementation.

In one non-limiting embodiment, a method is disclosed comprising receiving a read-type command at a data storage arrangement, calculating a command span of the received read-type command, performing a look-up command, through use of a processor, for data located in each extent at a condensed logical block address state table for the read-type command, wherein the condensed logical block address state table describes a logical to physical table and at least one of transmitting data and displaying data related to the read-type command found in the condensed logical block address state table.

In another non-limiting embodiment, the method may further comprise determining if during the look-up command an extent value is unmapped.

In another non-limiting embodiment, the method may further comprise dispatching the read-type command to a flash translation layer when the extent value is mapped.

In another non-limiting embodiment, the method may further comprise dispatching the read-type command to a flash translation layer when the extent value is partially mapped.

In another non-limiting embodiment, the method may further comprise advancing a command logical block address to a boundary of a next extent.

In another non-limiting embodiment, the method may further comprise determining if the command span overlaps the next extent of the condensed logical block address state table.

In another non-limiting embodiment, the method may further comprise performing another lookup for the condensed logical block address state table when the command span overlaps the next extent.

In another non-limiting embodiment, the method may be performed wherein the calculating the command span is performed through a formula of:

Command Span=Start LBA+Length−1.

In another non-limiting embodiment, the method may be performed wherein the data storage arrangement is a solid state drive.

In another non-limiting embodiment, a method for performing a write-type command, comprising receiving the write-type command at a data storage arrangement, calculating a command span length for the write-type command received, performing a look-up command, through use of a processor, for data located in a first extent of a condensed logical block address state table for the write-type command, wherein the condensed logical block address state table describes a logical to physical table and at least one of transmitting data and displaying data related to the write-type command found in the condensed logical block address state table.

In another non-limiting embodiment, the method may be performed wherein the calculating the command span length is performed through a formula of: Command Span=Start LBA+Length−1.

In another non-limiting embodiment, the method may further comprise determining if the calculated span length overlaps the first extent.

In another non-limiting embodiment, the method may further comprise when the calculated span overlaps the first extent, setting a new extent value equal to 11b.

In another non-limiting embodiment, the method may further comprise when the command span does not overlap the extent, determining if the command span is greater than an extent threshold.

In another non-limiting embodiment, the method may further comprise setting a new extent value equal to 10b when the span is greater than the extent threshold and setting the extent threshold to 01b when the command span is not greater than the extent threshold.

In another non-limiting embodiment, the method may further comprise determining if the new extent value is greater than the first extent; and setting the first extent value to the new extent value when the new extent value is greater than the first extent.

In another non-limiting embodiment, the method may be performed wherein the data storage arrangement is a solid state drive.

In another non-limiting embodiment, a method for performing a unmap-type of command is disclosed, comprising receiving the unmap-type command at a data storage arrangement, determining a logical block address range for processing, performing a look-up command, through use of a processor, for data located in a first extent of a condensed logical block address state table for the unmap-type command, wherein the condensed logical block address state table describes a logical to physical table and at least one of transmitting data and displaying data related to the unmap-type command found in the condensed logical block address state table.

In another non-limiting embodiment, the method may further comprise determining if the first extent value is equal to 0 and performing a look-up command, through use of a processor, for data located in a next extent of a condensed logical block address state table for the unmap-type command.

In another non-limiting embodiment, the method may be accomplished wherein the data storage arrangement is a solid state drive.

In another non-limiting embodiment, an apparatus for processing a read-type command is disclosed comprising means for receiving a read-type command at a data storage arrangement; means for calculating a command span of the received read-type command; means for performing a look-up command, through use of a processor means, for data located in each extent at a condensed logical block address state table for the read-type command and means for at least one of transmitting data and displaying data related to the read-type command found in the condensed logical block address state table.

In another non-limiting embodiment, the apparatus may further comprise means for dispatching the read-type command to a flash translation layer.

In another non-limiting embodiment, an apparatus for performing a write-type command is disclosed, comprising: means for receiving the write-type command; means for calculating a command span length for the write-type command received; means for performing a look-up command, through use of a processor, for data located in a first extent of a condensed logical block address state table for the write-type command and means for at least one of transmitting data and displaying data related to the write-type command found in the condensed logical block address state table.

In another non-limiting embodiment, the means for receiving the write-type command is a solid state drive.

In a still further non-limiting embodiment, an apparatus for performing an unmap-type command is disclosed comprising means for receiving the unmap-type command; means for determining a logical block address range for processing; means for performing a look-up command, through use of a processor, for data located in a first extent of a condensed logical block address state table for the unmap-type command and means for at least one of transmitting data and displaying data related to the read-type command found in the condensed logical block address state table.

In another non-limiting embodiment, the means for receiving the unmap-type command is a solid state drive.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A method, comprising:
   receiving a read-type command at a data storage arrangement;
   calculating a command span of the received read-type command;
   performing a look-up command, through use of a processor, for data located in each extent at a condensed logical block address state table for the read-type command, wherein the condensed logical block address state table describes a logical to physical table, wherein the condensed logical block address state table tracks logical block address state information ahead of the logical to physical table, and wherein the logical block address state information is mapped or unmapped;
   at least one of transmitting data and displaying data related to the read-type command found in the condensed logical block address state table;
   determining if the command span overlaps the next extent of the condensed logical block address state table; and
   performing another lookup for the condensed logical block address state table when the command span overlaps the next extent.

2. The method according to claim 1, further comprising: determining if during the look-up command an extent value is unmapped.

3. The method according to claim 2, further comprising: dispatching the read-type command to a flash translation layer when the extent value is mapped.

4. The method according to claim 2, further comprising: dispatching the read-type command to a flash translation layer when the extent value is partially mapped.

5. The method according to claim 2, further comprising: advancing a command logical block address to a boundary of a next extent.

6. The method according to claim 1, wherein the calculating the command span is performed through a formula of:

Command Span=Start LBA+Length−1.

7. The method according to claim 1, wherein the data storage arrangement is a solid state drive.

8. A method for performing a write-type command, comprising:
   receiving the write-type command at a data storage arrangement;
   calculating a command span length for the write-type command received;
   performing a look-up command, through use of a processor, for data located in a first extent of a condensed logical block address state table for the write-type command, wherein the condensed logical block address state table describes a logical to physical table, wherein the condensed logical block address state table tracks logical block address state information ahead of the logical to physical table, and wherein the logical block address state information is mapped or unmapped;
   at least one of transmitting data and displaying data related to the write-type command found in the condensed logical block address state table;
   determining if the calculated command span length overlaps the first extent; and
   when the calculated span overlaps the first extent, setting a new extent value equal to fully mapped.

9. The method according to claim 8, wherein the calculating the command span length is performed through a formula of:

Command Span=Start LBA+Length−1.

10. The method according to claim 8, further comprising:
    when the command span does not overlap the extent, determining if the command span is greater than an extent threshold.

11. The method according to claim 10, further comprising:
    setting a new extent value when the span is greater than the extent threshold and setting the extent threshold when the command span is not greater than the extent threshold.

12. The method according to claim 11, further comprising:
    determining if the new extent value is greater than the first extent; and
    setting the first extent to the new extent value when the new extent value is greater than the first extent.

13. The method according to claim 8, wherein the data storage arrangement is a solid state drive.

14. A method for performing a unmap-type command, comprising:
    receiving the unmap-type command at a data storage arrangement;
    determining a logical block address range for processing;
    performing a look-up command, through use of a processor, for data located in a first extent of a condensed logical block address state table for the unmap-type command, wherein the condensed logical block address state table describes a logical to physical table; and
    at least one of transmitting data and displaying data related to the unmap-type command found in the condensed logical block address state table, further comprising:
    determining if the first extent value is equal to 0; and
    performing a look-up command, through use of a processor, for data located in a next extent of a condensed logical block address state table for the unmap-type command.

15. The method according to claim 14, wherein the data storage arrangement is a solid state drive.

16. An apparatus for processing a read-type command, comprising:
    means for receiving a read-type command at a data storage arrangement;
    means for calculating a command span of the received read-type command;
    means for performing a look-up command, through use of a processor means, for data located in each extent at a condensed logical block address state table for the read-type command, wherein the condensed logical block address state table tracks logical block address state information ahead of a logical to physical table, and wherein the logical block address state information is mapped or unmapped;
    means for at least one of transmitting data and displaying data related to the read-type command found in the condensed logical block address state table;

means for determining if the command span overlaps the next extent of the condensed logical block address state table; and means for performing another lookup for the condensed logical block address state table when the command span overlaps the next extent.

17. The apparatus according to claim 16, further comprising:

means for dispatching the read-type command to a flash translation layer when an extent value is mapped.

18. An apparatus for performing a write-type command, comprising:

means for receiving the write-type command;

means for calculating a command span length for the write-type command received;

means for performing a look-up command, through use of a processor, for data located in a first extent of a condensed logical block address state table for the write-type command, wherein the condensed logical block address state table tracks logical block address state information ahead of a logical to physical table, and wherein the logical block address state information is mapped or unmapped;

means for at least one of transmitting data and displaying data related to the write-type command found in the condensed logical block address state table;

means for determining if the calculated command span length overlaps the first extent; and means for setting a new extent value equal to fully mapped when the calculated span overlaps the first extent.

19. The apparatus according to claim 18, wherein the means for receiving the write-type command is a solid state drive.

20. An apparatus for performing an unmap-type command, comprising:

means for receiving the unmap-type command;

means for determining a logical block address range for processing;

means for performing a look-up command, through use of a processor, for data located in a first extent of a condensed logical block address state table for the unmap-type command, wherein the condensed logical block address state table describes a logical to physical table;

means for at least one of transmitting data and displaying data related to the unmap-type command found in the condensed logical block address state table;

means for determining if the first extent value is equal to 0; and means for performing a look-up command, through use of a processor, for data located in a next extent of a condensed logical block address state table for the unmap-type command.

21. The apparatus according to claim 20, wherein the means for receiving the unmap-type command is a solid state drive.

22. A method, comprising:

receiving a read-type command at a data storage arrangement;

calculating a command span of the received read-type command;

performing a look-up command, through use of a processor, for data located in each extent at a condensed logical block address state table for the read-type command, wherein the condensed logical block address state table describes a logical to physical table, wherein the condensed logical block address state table tracks logical block address state information ahead of the logical to physical table, and wherein the logical block address state information is mapped or unmapped;

determining if the look-up command for the condensed logical block address state table has found unmapped blocks;

returning zero content data to a controller when the look-up command has found the unmapped blocks;

determining if the command span overlaps the next extent of the condensed logical block address state table; and performing another lookup for the condensed logical block address state table when the command span overlaps the next extent.

23. A method, comprising:

receiving one of a read-type command and a write-type command at a data storage arrangement;

calculating a command span of the received command;

performing a look-up command, through use of a processor, for data located in each extent at a condensed logical block address state table for the command, wherein the condensed logical block address state table describes a logical to physical table; wherein the condensed logical block address state table tracks logical block address state information ahead of the logical to physical table, and wherein the logical block address state information is mapped or unmapped;

determining a presence of fully unmapped blocks in the look-up command;

returning zero content data for the look-up command, bypassing a flash translation layer, when a presence of fully unmapped blocks is found in the look-up;

determining if the calculated command span length overlaps the first extent; and when the calculated span overlaps the first extent, setting a new extent value equal to fully mapped.

24. A method, comprising:

receiving data, related to an extent of a condensed logical block address state table, wherein the condensed logical block address state table tracks logical block address state information ahead of a logical to physical table, and wherein the logical block address state information is mapped or unmapped;

performing a search of the logical to physical mapping table for the logical block addresses related to the extent in the condensed logical block address state table;

updating the condensed logical block address state table when the presence of the data related to the extent is not found during the search;

determining if the first extent value is equal to 0; and performing a look-up command, through use of a processor, for data located in a next extent of a condensed logical block address state table for the unmap-type command.

25. The method according to claim 24, wherein the receiving data is performed during background operations.

* * * * *